Aug. 19, 1930.  V. D. CANFIELD  1,773,301
ANTIFRICTION BEARING
Filed July 19, 1926
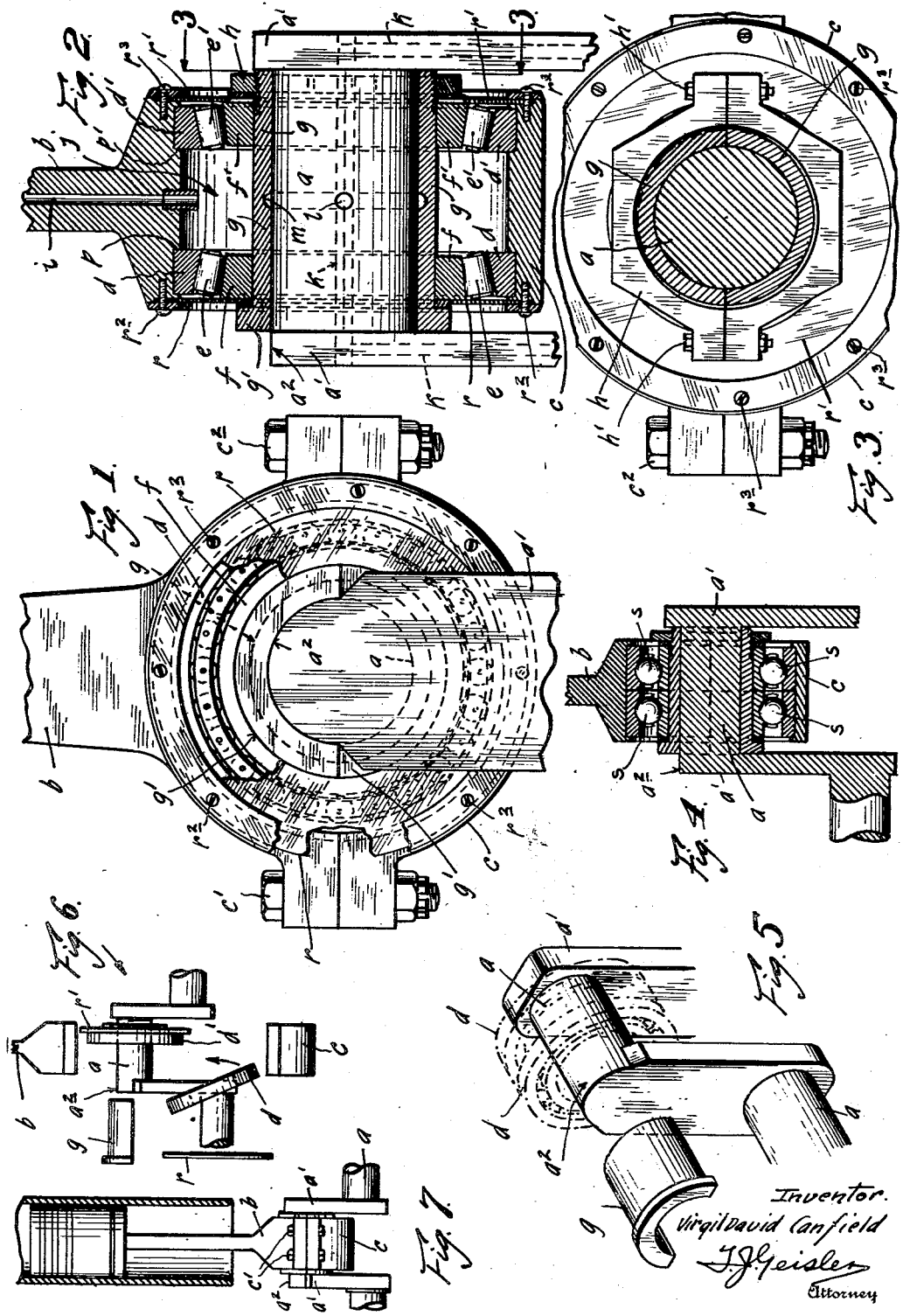
Inventor.
Virgil David Canfield
T. J. Geisler
Attorney Patented Aug. 19, 1930

1,773,301

UNITED STATES PATENT OFFICE

VIRGIL DAVID CANFIELD, OF EUGENE, OREGON

ANTIFRICTION BEARING

Application filed July 19, 1926. Serial No. 123,569.

The object of my invention is to provide a means for using in connection with a shaft having peripherally offset portions, a one-piece standard annular anti-friction bearing—the latter being understood to define a structure consisting of two races with balls or rollers between them.

A further object of my invention is to so arrange my anti-friction bearings that the same may be easily and quickly adjusted as necessary to take up wear.

And a still further object of my invention is so to arrange my anti-friction bearings in certain applications thereof as to include the provision of a lubricating chamber.

It is well known that a one-piece anti-friction bearing is greatly superior to a split anti-friction bearing, and numerous attempts have been made to produce efficient split bearings; but without success, apparently, for none is at present in general commercial use.

The difficulty of using a one-piece bearing on a shaft having protruding peripheral portions, as for example, the projection of the offsets or crank-arms beyond the crank shaft, consists in providing means for mounting the bearing firmly in place. The interior diameter of the bearing can be made of sufficient size to pass over the protruding peripheral portions of the offset portions of the shaft, but said protrusions would bar the insertion of the bushing in the eye of bearing on the shaft even though the bushing be split, which of course it must be. The same difficulty exists against the use of one-piece anti-friction bearings on straight shafts having peripheral flanges.

I attain my object by reducing the protrusions on the shaft, over which the bushing segment must be slid into place, so as to coincide with the periphery of the shaft, thus providing a space through which the bushing segments may be successively inserted into the eye of the bearing, on the shaft.

Thus my invention may be said to consist in the combination with a shaft having peripheral protrusions, of an anti-friction bearing, the races of which are in one piece, and the interior diameter of the inner race being sufficient to permit the passing thereof over the offset portion of the shaft and other protrusions thereof; and a split cylindrical bushing adapted to be inserted in the eye of said inner race on said shaft, that protrusion of the shaft over which the bushing parts are inserted being reduced for part of the circumference of the shaft to coincide with the periphery of the latter, and thus provide a space through which the bushing parts may be successively inserted.

I will now explain and describe my invention in detail with reference to the accompanying drawings in which:

Fig. 1 is a side elevation of the extremity of a connnecting rod mounted on my anti-friction bearing; this view showing that side of the crank-shaft of which the peripheral protrusion of the offset portion of the shaft has been reduced so as to coincide with the periphery of the said offset shaft portion; a portion of the lateral housing of the anti-friction bearing is shown as broken away to disclose the roller bearing and the races assembled therein;

Fig. 2 shows a central longitudinal section of Fig. 1; this view particularly illustrates my anti-friction bearing as composed of two tapered roller-bearing units enclosed at their sides to provide a lubricating chamber, and further illustrates means for adjusting the said bearing units;

Fig. 3 is a fragmentary section taken on the line 3—3 of Fig. 2 showing the far side of my anti-friction bearing with respect to Fig. 1, and further shows one of the discs provided at the sides of my bearing to form a lubrication chamber. This view further illustrates how the split-bushing of my bearing is held together by the split nut at said far side;

Fig. 4 is a transverse section of a portion of a crank-shaft on which is mounted a modification of my invention in that ball bearings are provided in the place of roller bearings, and no lubricating chamber, or means of internal lubrication are provided;

Fig. 5 is a perspective view of a portion of a crank-shaft illustrating how the split-bushing of my bearing is assembled over the crank-shaft, and that the protruding portion of the shaft is reduced to coincide with the periphery of the crank-shaft, so that the half split-bushings may be slipped into the bearings successively;

Fig. 6 shows diagrammatically the various parts of my anti-friction bearing as shown by Fig. 2, and illustrates the mode by which the parts of my bearings are successively assembled on the crank-shaft; and Fig. 7 is a diagrammatic fragmentary sectional view of a cylinder illustrating the connecting rod of the piston of the cylinder as mounted by my improved anti-friction bearing on a crank-shaft.

On the crank-shaft $a$ the connecting rod $b$ and its cap $c$ are assembled and held in place by the bolt $c'$ and $c^2$.

My anti-friction bearing is composed of the outer races $d$ and $d'$, the rollers $e$ and $e'$, the inner races $f$ and $f'$, and the split-bushing $g$, said bushing being threaded at one end and provided with a flange $g'$ at the other. A nut $h$ is provided which is split in half to facilitate its assembly on the crank-shaft and over the threaded end of the bushing $g$, and is held together by the bolts $h'$.

Shoulders $p$ and $p'$ are provided in the connecting rod $b$ and its cap $c$, which hold the outer races $d$ and $d'$ spaced apart, and form the lubrication chamber $j$, the chamber $j$ being enclosed by two annular discs $r$ and $r'$, which are held in place by bolts $r^2$ and $r^3$. The inner races $f$ and $f'$ are restrained from lateral movement by the nut $h$ and the flange $g'$ on their respective sides.

In the connecting rod $b$ an oil groove $i$ is provided which leads into said lubrication chamber $j$ to provide lubrication for the bearings $e$ and $e'$. Another oil groove $k$ is provided through the crank-shaft $a$ leading to an oil port $l$ which feeds the oil into an annular groove $m$ in the bushing $g$. One of the protruding portions $a'$ of the crank-shaft $a$ is reduced to coincide with the periphery of the crank-shaft as at $a^2$.

The assembly of my anti-friction bearing is as follows:

Referring to Fig. 6: The disc $r'$ is placed over the crank-shaft from the end on which the protruding peripheral portion is reduced, the bearing which comprises the outer races $d'$, rollers $e'$ and the inner face $f'$ is next put in place, and then the other bearing comprising the outer race $d$, the rollers $e$ and the inner race $f$, and the disc $r$ is put in place.

The split-bushing $g$ is inserted, one part at a time on the crank-shaft and inside the inner race of said bearings, and the discs $r$ and $r'$. The nut $h$ is assembled and held in place by the bolts $h'$, and is threaded on the bushing $g$, to hold the said bushing in position.

As the final step, the connecting rod $b$ and cap $c$ are assembled around my anti-friction bearing and bolted in place by the bolts $c'$ and $c^2$, the nut $h$, which is also provided for taking up the wear of my anti-friction bearing, is then adjusted, and my anti-friction bearing is completely assembled.

Referring now to Fig. 4, I show a modification of my anti-friction bearing in which ball-bearings $s$ and $s'$ are substituted for roller bearings $e$ and $e'$, but otherwise is the same as my other bearing, also no lubrication chamber is provided, nor any channels for internal lubrication, both sides of the eye of the connecting rod $b$ and cap $c$ being left open to provide means for external lubrication.

Although I have only shown my improved anti-friction bearing mounted on a crank-shaft, it is understood that it is adapted to any form of a shaft provided with peripheral flanges on which it is desirable to mount my one-piece anti-friction bearing.

I claim:

1. In an anti-friction bearing assembly the combination of a crank shaft having a crank section provided with intermediate spaced shaft sections, an anti-friction bearing mounted on said shaft section comprising a one piece anti-friction ring and a longitudinally divided bushing therefor, the bushing portions provided with a retaining flange at one end and a retaining collar removably mounted on the opposite ends of the bushing portions, one of the angular arms included in said crank section forming a shoulder for the adjacent shaft section and the terminus of the companion arm of said crank section being made flush with the said shaft section, and the bushing adapted to be arranged over the said shaft section with the retaining flange adjacent to the flush terminus of said crank extension, and the said collar mounted on the opposite end between the said bearing and the said shoulder formed by the said extension of the companion crank arm, whereby the said collar is held on said bushing to maintain the assembly of said anti-friction bearing.

2. In an anti-friction bearing assembly the combination of a crank shaft having a crank section provided with intermediate spaced shaft sections, an anti-friction bearing mounted on said shaft section comprising an anti-friction ring and a longitudinally divided bushing therefor, the bushing portions provided with a retaining flange at one end and a retaining collar removably mounted on the opposite ends of the bushing portions, one of the angular arms included in said crank section forming a shoulder for the adjacent shaft section and the terminus of the companion arm of said crank section being made flush with the said shaft section, and the bushing adapted to be arranged over the said shaft section with the retaining flange adjacent to the flush terminus of said crank extension, and the said collar mounted on the opposite end between the said bearing and the said shoulder formed by the said extension of the companion crank arm, whereby the said collar is held on said bushing to maintain the assembly of said anti-friction bearing.

VIRGIL DAVID CANFIELD.